United States Patent
Quintin

(10) Patent No.: US 11,258,456 B2
(45) Date of Patent: Feb. 22, 2022

(54) METHOD FOR COMPRESSING A QUANTUM STATE VECTOR AND PROCESS FOR STORING A QUANTUM STATE VECTOR

(71) Applicant: BULL SAS, Les Clayes sous Bois (FR)

(72) Inventor: Jean Noël Quintin, Bourg la Reine (FR)

(73) Assignee: BULL SAS, Les Clayes sous Bois (FR)

( * ) Notice: Subject to any disclaimer, the term of this patent is extended or adjusted under 35 U.S.C. 154(b) by 221 days.

(21) Appl. No.: 16/578,736

(22) Filed: Sep. 23, 2019

(65) Prior Publication Data

US 2020/0099391 A1 Mar. 26, 2020

(30) Foreign Application Priority Data

Sep. 24, 2018 (FR) ...................... 18 58676

(51) Int. Cl.
*H03M 7/30* (2006.01)
*G06N 10/00* (2022.01)
*G06F 17/16* (2006.01)

(52) U.S. Cl.
CPC .............. *H03M 7/30* (2013.01); *G06F 17/16* (2013.01); *G06N 10/00* (2019.01)

(58) Field of Classification Search
CPC .......... H03M 7/30; G06F 17/16; G06N 10/00; H04L 9/0858; H04L 2209/34
USPC ....................................................... 708/203
See application file for complete search history.

(56) References Cited

U.S. PATENT DOCUMENTS

2019/0042974 A1* 2/2019 Daraeizadeh ........... G06T 15/00
2020/0005186 A1* 1/2020 Romero ................. G06N 20/00

OTHER PUBLICATIONS

French Search Report, dated Aug. 30, 2019, from corresponding French application No. FR 18 58676.
Mitsumori et al.; Experimental demonstration of quantum source coding; Physical Review Letters; Apr. 4, 2003; vol. 31, No. 91, 217902.
Preskill; Quantum Shannon Theory; Arxiv.org, Cornell University Library; Apr. 25, 2016.

* cited by examiner

*Primary Examiner* — Tan V Mai
(74) *Attorney, Agent, or Firm* — Meagher Emanuel Laks Goldberg & Liao, LLP.

(57) ABSTRACT

A method for compressing a quantum state vector includes: aggregating a group of several neighboring states of the vector into a cluster of states of the vector, a parameter representative of the probability of this cluster being associated with it and corresponding to the sum of the probabilities of the aggregated neighboring states in this cluster, the probability of each aggregated neighboring state being below a given aggregation threshold, and/or the sum of the probabilities of the aggregated neighboring states in a cluster being below another given aggregation threshold; and preserving a state of the vector not aggregated in a cluster, the parameter representative of its probability remaining unchanged. The method includes several steps of aggregating several distinct groups of several neighboring states of the vector, respectively into several clusters of states of the vector, and/or an aggregation step and a preservation step.

20 Claims, 3 Drawing Sheets

METHOD FOR COMPRESSING A QUANTUM STATE VECTOR AND PROCESS FOR STORING A QUANTUM STATE VECTOR

FIELD OF THE INVENTION

The invention relates to a method for compressing a quantum state vector, and a process for storing a quantum state vector comprising a step of compressing a quantum state vector.

BACKGROUND OF THE INVENTION

According to a first prior art, there is a known method of data compression commonly called "zip compression". This compression method saves space in memory. However, this method does not know the nature of the compressed data, thus limiting the compression ratio.

The present invention improves the situation.

SUMMARY OF THE INVENTION

The invention relates to a method for compressing a quantum state vector, in particular during a simulation of a quantum circuit on a quantum computer. The method thus enables a very high optimization of the storage space in memory by greatly reducing the run time of the simulation.

The compression, which is at a very high rate, consists of preserving a few high-probability quantum states and compressing a very large number of low-probability quantum states.

Most often, the desired quantum state is obtained directly and immediately and the information lost for the low-probability quantum states therefore has no effect. Indeed, in most cases, the desired state is one having a high probability. The memory required and the run time are therefore not very high at all.

In the minority of the remaining cases, when the desired state is part of an aggregate of low-probability quantum states, it is possible to reconstruct the lost information. The storage space in memory is still very small and the reconstruction is less expensive in run time than a full simulation.

To prevent aggregates from containing a very large number of quantum states, it is possible to provide several sub-aggregates of reduced size, so that the run time required for the reconstruction is even lower.

In addition, it is possible to aggregate neighboring quantum states having the same probability. This has the advantage of not requiring any additional reconstruction step when the desired state is located in such an aggregate.

The compression method therefore allows offering a particularly high compression ratio by having, in the vast majority of cases, a direct and immediate recovery of the desired information and a loss of information without harmful effect, and, in the other rare cases, the possibility of completely recovering the lost information at the cost of a limited and reasonable run time.

The run time is thus greatly improved since the quantum states that will be used in the vast majority of cases are directly accessible. The memory required is also optimized by the aggregation of low-probability quantum states.

For this purpose, the present invention provides a method for compressing a quantum state vector, comprising:
  at least one step of aggregating a group of several neighboring states of the vector into a cluster of states of the vector,
    a parameter representative of the probability of this cluster being associated with it and corresponding to the sum of the probabilities of the aggregated neighboring states in this cluster,
    the probability of each aggregated neighboring state being below a given aggregation threshold, and/or the sum of the probabilities of the aggregated neighboring states in a cluster being below another given aggregation threshold,
  preferably at least one preservation step,
    a state of the vector not aggregated in a cluster being preserved, the parameter representative of its probability remaining unchanged,
  the compression method comprising:
    at least several steps of aggregating several distinct groups of several neighboring states of the vector, respectively into several clusters of states of the vector,
    and/or at least one aggregation step and at least one preservation step.

According to preferred embodiments, the invention comprises one or more of the following features which may be used separately or in any combination.

Preferably, the method comprises several steps of aggregating several distinct groups of several neighboring states of the vector, respectively into several clusters of states of the vector, and several preservation steps.

The compression ratio is thus further optimized and/or the run time, when the lost information is recovered, is further decreased.

Preferably, the probability of each aggregated neighboring state is below a given threshold, and the sum of the probabilities of the aggregated neighboring states in a cluster is below another given threshold.

The application of a double-threshold condition thus makes it possible to ensure that the probability associated with an aggregate never exceeds a too-high probability value which would increase the run time in the event of the recovery of lost information. Indeed, the low-probability quantum states are aggregated because there is very little chance that the desired quantum state is located in this aggregate. If the sum of the probabilities of the low-probability aggregated quantum states is too large, the run time required to find the desired quantum state among the plurality of aggregated quantum states would be too expensive.

Preferably, the probability of each preserved state is above a given preservation threshold, and/or the sum of the probabilities of the preserved states is above another given preservation threshold.

This makes it possible to avoid preserving a quantum state whose probability is too low. Indeed, the higher the probability of a preserved state, the greater the chances that this quantum state is the desired quantum state.

In this manner, the run time is optimized because the quantum state is obtained directly.

Preferably, the method also comprises an aggregation step comprising the grouping of several neighboring quantum states for which the probabilities are all identical.

In this case, the method advantageously also comprises:
  at least one step of aggregating several neighboring states of the vector into a cluster of states of the vector,
    a parameter representative of the probability of this cluster being associated with it and corresponding to the sum of the probabilities of the neighboring states aggregated in this cluster, the probabilities of all the neighboring states aggregated in the same group being equal to each other.

In this manner, when the probability of the desired state is equal to the probability of the neighboring aggregated states of the same probability, no further reconstruction step is necessary. The run time is therefore considerably reduced.

Preferably, said given aggregation threshold and/or said other given aggregation threshold are proportional to the inverse of the logarithm of the number of quantum states.

The coefficient that can be applied to the inverse of the logarithm of the number of quantum states is preferably between 0.1 and 10. This value is chosen because, in the case of vectors comprising a very large number of quantum states, this allows aggregating a vast majority of the states, while preserving the quantum states of sufficiently high probability so that the saved storage space in memory is not achieved at the cost of an excessive increase in run time, which would not eliminate its attractiveness in the compression method proposed by the invention but would diminish its benefits. In particular, these given aggregation thresholds make it possible to ensure that the quantum states preserved will be the ones wanted, in the vast majority of cases.

Preferably, said given preservation threshold and/or said other given preservation threshold is or are chosen so that the number of clusters is proportional to the logarithm of the number of quantum states, with a coefficient of proportionality preferably comprised between 0.1 and 10, and/or said given preservation threshold and/or said other given preservation threshold is or are chosen so that the number of clusters remains less than 1000, preferably less than 100.

This optimizes the reduction of the storage space in memory and of the run time. On the one hand, the ideal quantification of the number of aggregates makes it possible to ensure that the aggregates are not too large, which implies a certain number of aggregates, so that the run time remains very limited in cases where a quantum state is recovered from an aggregate. On the other hand, it is important to have a sufficiently small number of aggregates so that their storage space in memory remains very small. A number of aggregates proportional to the logarithm of the number of quantum states provides a good compromise between these two constraints.

Preferably, said given preservation threshold and/or said other given preservation threshold is or are chosen so that the number of clusters remains greater than 10.

As mentioned above, the preservation and/or aggregation thresholds are chosen so that the size of the aggregates is not too high.

Preferably, the vector comprises at least $2^{20}$ quantum states, preferably more than $2^{25}$, still more preferably more than $2^{30}$, advantageously more than $2^{35}$.

The compression method is applied to quantum state vectors of very large size. The compression method according to the invention makes it possible to process these types of vectors while optimizing the size in memory as well as the run time, which is very attractive when processing such amounts of data.

Preferably, at least 90% of the quantum states of the vector are aggregated, preferably at least 99%, more preferably at least 99.9%.

The compression ratio obtained by the compression method is therefore very significant. This is particularly advantageous when this method is applied to very large vectors. The storage space required in memory after compression is effectively optimized in a very significant manner.

Preferably, the ratio of the number of aggregated states to the number of non-aggregated states is greater than $2^{20}$, preferably greater than $2^{25}$, still more preferably greater than $2^{30}$, advantageously greater than $2^{35}$.

The compression ratio obtained by the compression method is then very high and therefore very attractive. It appears that the compression ratio increases exponentially with the size of the quantum vector. The compression method is therefore particularly suitable for quantum state vectors of very large size.

Preferably, one or more steps of aggregating one or more groups of several neighboring states of the vector into one or more clusters of states of the vector, is or are performed by assigning, to said cluster, a parameter representative of the probability of this cluster corresponding to the complement of the sum of the probabilities of the states previously determined, meaning both the aggregated continuous states and the preserved states.

In other words, the operation 1−(pa+pc) is carried out, where pa is the sum of the probabilities of the aggregated states, and pc is the sum of the probabilities of the preserved states. The quantum state vector does not need to be fully computed, in other words it is not necessary to determine all the quantum states. This considerably reduces the run time.

Preferably, the number of states of the quantum state vector is greater than $2^{20}$, preferably greater than $2^{25}$, still more preferably greater than $2^{30}$, advantageously greater than $2^{35}$, and preferably the number of quantum state vectors to which the compression method is applied, is greater than $2^{20}$, preferably greater than $2^{25}$, still more preferably greater than $2^{30}$, advantageously greater than $2^{35}$.

The compression method is equally applicable to a very large number of quantum state vectors each comprising a very large number of quantum states. The compression method is particularly suitable here, since the compression ratio obtained increases exponentially with the number of vectors and/or quantum states. The compression method then makes it possible to carry out simulations comprising a very large amount of data without the memory being saturated or the run time becoming too significant.

The present invention also provides a process for storing a quantum state vector, comprising:
- a step of identifying the different states of the vector and the parameters representative of the probabilities respectively associated with them,
- a step of compressing the vector, using the method for compressing a quantum state vector according to the invention,
- a step of determining the probability of the desired quantum state,
- a step of associating the desired quantum state with the determined probability,
  - either simply by extracting the desired quantum state corresponding to the determined probability, when the desired quantum state is preserved,
  - or by recovering the desired quantum state corresponding to the determined probability, when the desired quantum state is aggregated in a cluster, by recalculating this desired quantum state aggregated in this cluster.

On the one hand, the process according to the invention thus makes it possible to recover the desired quantum state directly when it has been preserved after applying the compression method. The run time is then greatly reduced. The other quantum states do not need to be determined and the loss of information remains without any detrimental effect. This provides very large savings in the storage space required in memory.

On the other hand, when the desired quantum state is part of a cluster of quantum states, it is possible to recover this quantum state. There is therefore no irreversible loss of information. The run time required for the recovery remains negligible compared to completely rerunning a simulation.

According to preferred embodiments, the invention comprises one or more of the following features which may be used separately or in any combination.

Preferably, the desired quantum state vector is returned as output from a quantum computer.

The process according to the invention then makes it possible to recover the desired quantum state for subsequent use in different applications.

Preferably, all or part of the quantum states of the cluster containing said desired quantum state is or are recalculated, and no quantum state of the other clusters which do not contain said desired quantum state is recalculated.

The step of recovering an aggregated quantum state thus makes it possible to optimize the run time. Indeed, the recovery is done in an optimized manner, targeting the quantum states to be recalculated and only those states. The rest of the information can be lost without risk, because it is not needed for the recovery of the desired quantum state. This also optimizes the storage space required in memory.

Preferably, the quantum states of the cluster containing said desired quantum state are successively recalculated until said desired quantum state is obtained, or the quantum states of the cluster containing said desired quantum state are all recalculated in parallel in order to obtain said desired quantum state.

Two recalculation methods can be used. These two methods can advantageously be chosen according to the type of aggregate. Thus, for an aggregate containing a very large quantity of quantum states, the calculation of each quantum state can be done in parallel to optimize the run time. For aggregates comprising fewer quantum states, serial recalculation can be performed in order to reduce computational resources.

Preferably, the recovery recalculates this desired quantum state aggregated in this cluster by applying a partial simulation method to all or part of the quantum states aggregated in this cluster The use of a partial simulation method makes it possible to return a single quantum state, this state being the desired quantum state. The partial simulation method is executed only on the cluster in which the desired quantum state is located, which eliminates unnecessary calculations that are costly in terms of run time.

Preferably, the partial simulation method is:
a Feynman method, in other words via a path integral.

The present invention also provides a process for storing a quantum state vector, comprising:
a step of identifying the different states of the vector and the parameters representative of the probabilities respectively associated with them,
a step of compressing the vector using the method for compressing a quantum state vector according to the invention,
a step of determining the probability of the desired quantum state,
and one of the following two steps:
either a step of associating the desired quantum state with the determined probability, simply by extracting the desired quantum state corresponding to the determined probability, when the desired quantum state is preserved,
or a step of recalculating all the quantum states of said stored quantum state vector.

This storage process is particularly advantageous when the probability of the preserved quantum states or the sum of the probabilities of the preserved quantum states is significant, in particular close to 1. Thus, most of the time the recalculation of all the quantum states does not take place, and the process is inexpensive in terms of run time.

The present invention also provides a process for decoding a cryptographic key, comprising a method for compressing a quantum state vector according to the invention or a process for storing a quantum state vector according to the invention.

The process according to the invention and/or the compression method according to the invention have particularly interesting technical applications. In particular, decoding methods generally have a very long run time, due to the very large amount of data to be processed. The method and process according to the invention allow reducing this run time and decreasing the memory space required for storing the data. Very efficient processes for cryptographic key decoding result from this.

The present invention also relates to a process for searching a database for an item stored in this database, according to one or more search criteria for this database, comprising a method for compressing a quantum state vector according to the invention or a process for storing a quantum state vector according to the invention.

The process according to the invention and the compression method according to the invention have another, particularly advantageous technical application in processes for searching a database. The process and method according to the invention are particularly suitable for retrieving information very quickly, without the need to keep a large amount of data in memory.

The invention also relates to a process for the determination of quantum state vectors by a quantum processor in a quantum computer, comprising a compression method according to the invention.

The determination of quantum state vectors is done very efficiently, since the memory space required for the determination is highly optimized due to the very high compression ratio of the quantum state vectors. In addition, the run time is also highly optimized since the quantum states are determined directly in the vast majority of cases, without reconstruction.

The invention also relates to a process for simulating a quantum circuit, comprising a compression method according to the invention.

The simulation of the quantum circuit is carried out quickly by means of the compression method, which greatly reduces the run time. Indeed, the compression method makes it possible to retrieve the desired quantum state directly in the vast majority of cases, since the high-probability quantum states are preserved. In addition, the memory required is also optimized, since the very numerous low-probability quantum states are aggregated together into a very limited number of clusters.

DETAILED DESCRIPTION OF THE INVENTION

Figure 1:
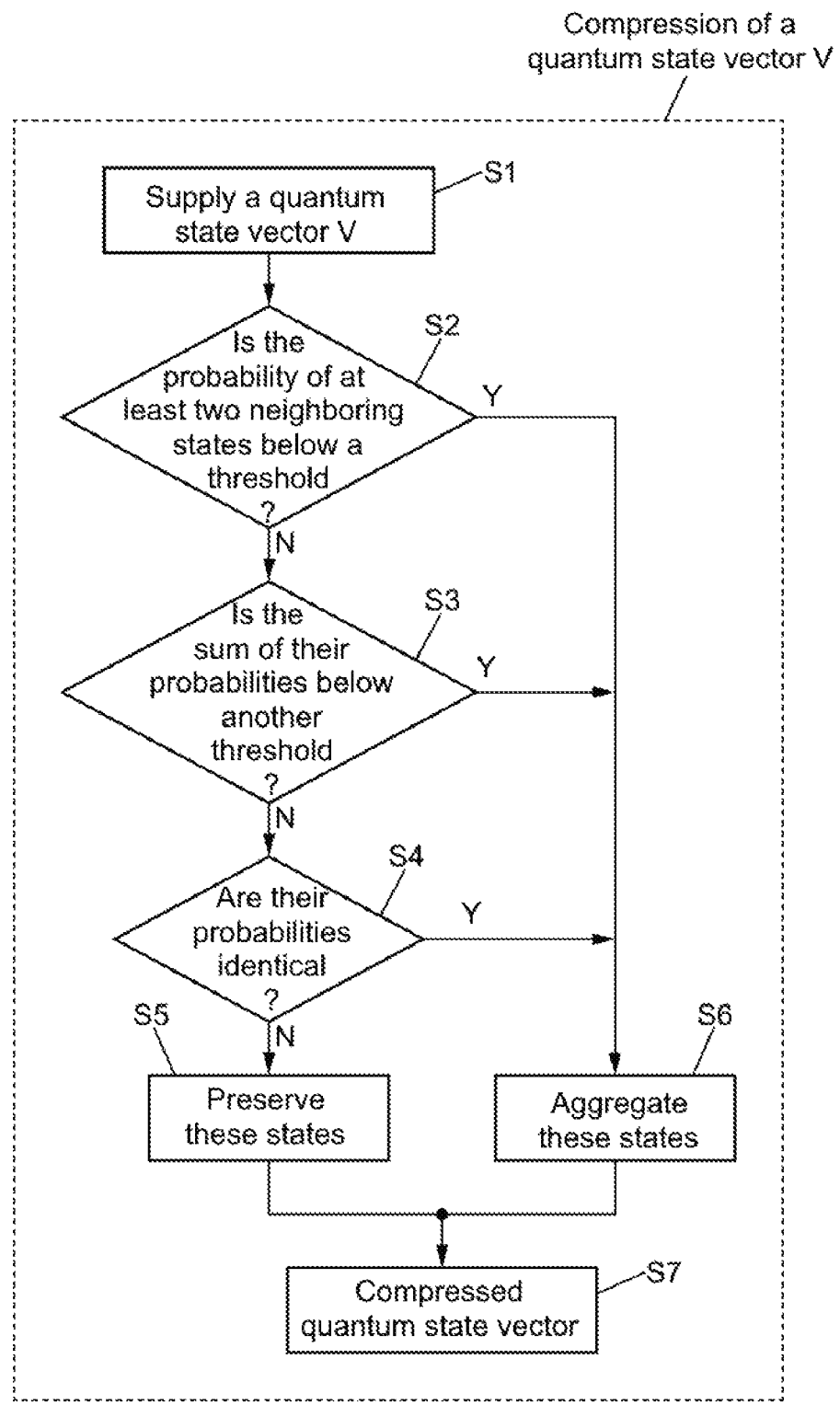
FIG. 1 is a flowchart representing the main steps of the method for compressing a quantum state vector according to one exemplary embodiment of the invention.

FIG. 1 illustrates an example of the compression of a vector V of quantum states, according to an exemplary embodiment of the invention. A quantum state vector is composed of a plurality of qbits, having 0 and 1 as the quantum state.

In step S1, such a quantum state vector V is provided. In one embodiment, this quantum state vector V may comprise 20 qbits, preferably 30 qbits, and even more preferably 36 qbits. The quantum state vector V thus comprises at least $2^{20}$ quantum states, preferably more than $2^{25}$, still more preferably more than $2^{30}$, and advantageously more than $2^{35}$.

A probability is associated with each quantum state of the vector, the sum of all the probabilities being equal to 1. More precisely, the quantum state vector comprises an amplitude for each possible quantum state, the square of the amplitude being the probability associated with this quantum state.

This represents a very large amount of data, in particular about 16 GB of data, up to several TB of data.

The quantum state of each qbit is not known. A parameter representative of its probability of appearance is associated with each quantum state of the vector.

The compression method comprises aggregating several neighboring quantum states (at least two) into a cluster of states, on the basis of a chosen criterion.

The compression method may further comprise the preservation of at least one quantum state, according to a chosen criterion.

In particular, as illustrated in step S2, a first criterion comprises the determination that at least two neighboring quantum states respectively have a probability below a first threshold.

Thus, if the quantum state vector V comprises n quantum states, E, it is verified that a quantum state $E_i$ comprises a probability $P_i$ below the first threshold. If a neighboring quantum state, for example the quantum state $E_{i-1}$, also comprises a probability $P_{i-1}$ less than the first threshold, the two neighboring quantum states $E_{i-1}$ and $E_i$ are aggregated into a cluster of two quantum states. A parameter representative of the probability of this cluster Pr is assigned to them. This parameter, the probability of the cluster Pr, can be the sum of the probabilities $P_i$, $P_{i-1}$ of the two aggregated quantum states $E_i$, $E_{i-1}$.

In the same manner, if the quantum state $E_{i+1}$ comprises a probability $P_{i+1}$ below the first threshold, $E_{i+1}$ is aggregated with the two quantum states $E_{i-1}$, $E_i$ to form a cluster of three quantum states, for which the probability Pr is equal to the sum of the probabilities $P_{i-1}$, $P_i$, $P_{i+1}$.

The aggregation of several neighboring quantum states E into a cluster of quantum states is illustrated in step S6.

When a quantum state $E_j$ comprises a probability $P_j$ above the first threshold, the aggregation of several neighboring quantum states into a cluster is stopped.

However, even when a quantum state comprises a probability above the first threshold, other neighboring quantum states can be aggregated into a cluster of quantum states according to step S2. Thus, if the quantum states $E_{j+1}$ and $E_{j+2}$ respectively have a probability below the first threshold, they are aggregated into a cluster of quantum states.

A second aggregation criterion, illustrated in step S3, can also be applied. For example, this second criterion can be applied to quantum states that were not aggregated in step S2.

The second criterion comprises, for example, determining that the sum of the probabilities of at least two neighboring quantum states is less than a second threshold. When the sum of the probabilities of the two neighboring states is less than the second threshold, these two neighboring quantum states are aggregated into a cluster of quantum states. A parameter representative of the cluster probability is associated with it. This parameter is for example the sum of the probabilities of each quantum state of the cluster.

In other words, if the sum of the probabilities Ps of two neighboring quantum states, $E_{j-1}$ of probability $P_{j-1}$ and $E_j$ of probability $P_j$, is lower than a second threshold, meaning $P_{j-1}+P_j$ is lower than the second threshold, the two neighboring states $E_{j-1}$, $E_j$ are aggregated into a cluster of quantum states in step S6. The probability of this cluster Ps is equal to $P_{j-1}+P_j$.

When neither the first nor the second criterion is met, a third criterion can be applied in step S5.

The third criterion comprises determining that at least two neighboring quantum states comprise the same probability.

In other words, if at least two neighboring quantum states $E_k$, $E_{k+1}$, of respective probability $P_k$, $P_{k+1}$, have equal probability, the two neighboring quantum states $E_k$, $E_{k+1}$ are aggregated into a cluster of quantum states in step S6. The probability of this cluster is the sum of probabilities $P_k$, $P_{k+1}$.

When a quantum state E does not meet one of these three criteria, this state is preserved in step S5. The probability of the preserved quantum state does not change.

In step S7, the compressed quantum state vector V is obtained.

Advantageously, the compression method comprises several steps of aggregating several distinct groups of quantum states into several clusters of quantum states.

Advantageously, the compression method also comprises at least one step of preserving a quantum state.

Preferably, the compression method comprises several aggregation steps and several preservation steps.

The compression method illustrated in FIG. 1 is one exemplary embodiment.

In another example, only the first criterion (step S2) is applied.

In another example, only the second criterion (step S3) is applied.

In another example, only the third criterion (step S4) is applied.

In another example, only the first and second criteria (steps S2 and S3) are applied.

In another example, the first and second criteria are cumulative. In other words, for at least two neighboring quantum states to be aggregated into a cluster of quantum states, their respective probability must be below the first threshold and the sum of their probabilities must be below the second threshold.

In another example, only the first and third criteria (steps S2 and S4) are applied.

In another example, only the second and third criteria (steps S3 and S4) are applied.

It is also understood that the compression method can also be applied using other criteria. For example, a first preservation threshold may be defined. In this variant embodiment, it is possible not to implement steps S1 to S3. In this variant, it is determined whether a quantum state comprises a probability greater than the first preservation threshold. If so, this quantum state is preserved. The neighboring quantum states comprising a probability lower than the preservation threshold are aggregated.

According to another variant, all the quantum states, whether neighboring or not, comprising a probability below the first preservation threshold are aggregated.

According to another variant embodiment, a second preservation threshold may be defined. According to this variant, it is determined whether the sum of the quantum state probabilities is above the second preservation threshold. If such is the case, these quantum states are preserved. The neighboring quantum states comprising a probability below the preservation threshold are aggregated.

According to another variant, all the quantum states, whether neighboring or not, comprising a probability below the second preservation threshold are aggregated.

Another criterion may be defined, according to which the applications of the first and second preservation thresholds are cumulative in order for a quantum state to be preserved. Thus, only the quantum states comprising a probability above the first preservation threshold are preserved. Once the sum of their probability is greater than the second preservation threshold, all remaining quantum states are aggregated.

According to another embodiment, when one or more quantum states are missing, the probability associated with them is deduced from the probabilities associated with the aggregated or preserved quantum states. In fact, the sum of the probabilities associated with a quantum state or a cluster of quantum states is equal to 1. The probability of the missing quantum states is thus equal to the complement of the sum of the known probabilities. In other words, the missing probability is found by the operation: 1−(sum of known probabilities).

Since the number of quantum states of the quantum state vector is very large, the first and second thresholds are chosen to considerably reduce the size of the quantum state vector. However, in applications of the quantum state vector, it may be useful to preserve the quantum states associated with a high probability: it is these quantum states that are most likely to need to be recovered after compression of the quantum state vector. The first threshold and second threshold therefore must not be too low.

For example, the first threshold and the second threshold are proportional to the inverse of the logarithm of the number of quantum states. In other words, if the quantum state vector comprises n quantum states, the first and second threshold will be equal to $c/\log(n)$, where c is a real number which may have a different value for the first threshold and for the second threshold.

In particular, c may be chosen such that the number of distinct clusters of quantum states is proportional to the logarithm of the number of quantum states of the quantum state vector. In other words, the number of distinct clusters can be equal to $d \cdot \log(n)$, where d is a real number preferably comprised between 0.1 and 10.

Alternatively, c may be chosen so that the number of clusters remains below 10,000, preferably below 1,000, and preferably below 100. These orders of magnitude also depend on the size of the quantum state vector, and therefore on the number of quantum states. The real number c may also be chosen so that the number of clusters is always greater than 10.

Thus, according to these embodiments, between 90% and 99.9% of the quantum states of the quantum state vector are aggregated.

In other words, and in view of the very large number of quantum states of the quantum vector, the compression method according to this exemplary embodiment makes it possible to obtain a ratio of the number of aggregated states to the number of preserved states that is between $2^{20}$ and $2^{35}$.

The compression method is particularly advantageous because it can be applied simultaneously to a number comprised between $2^{20}$ and $2^{35}$ of quantum state vectors, each comprising at least $2^{20}$ quantum states.

Figure 2:
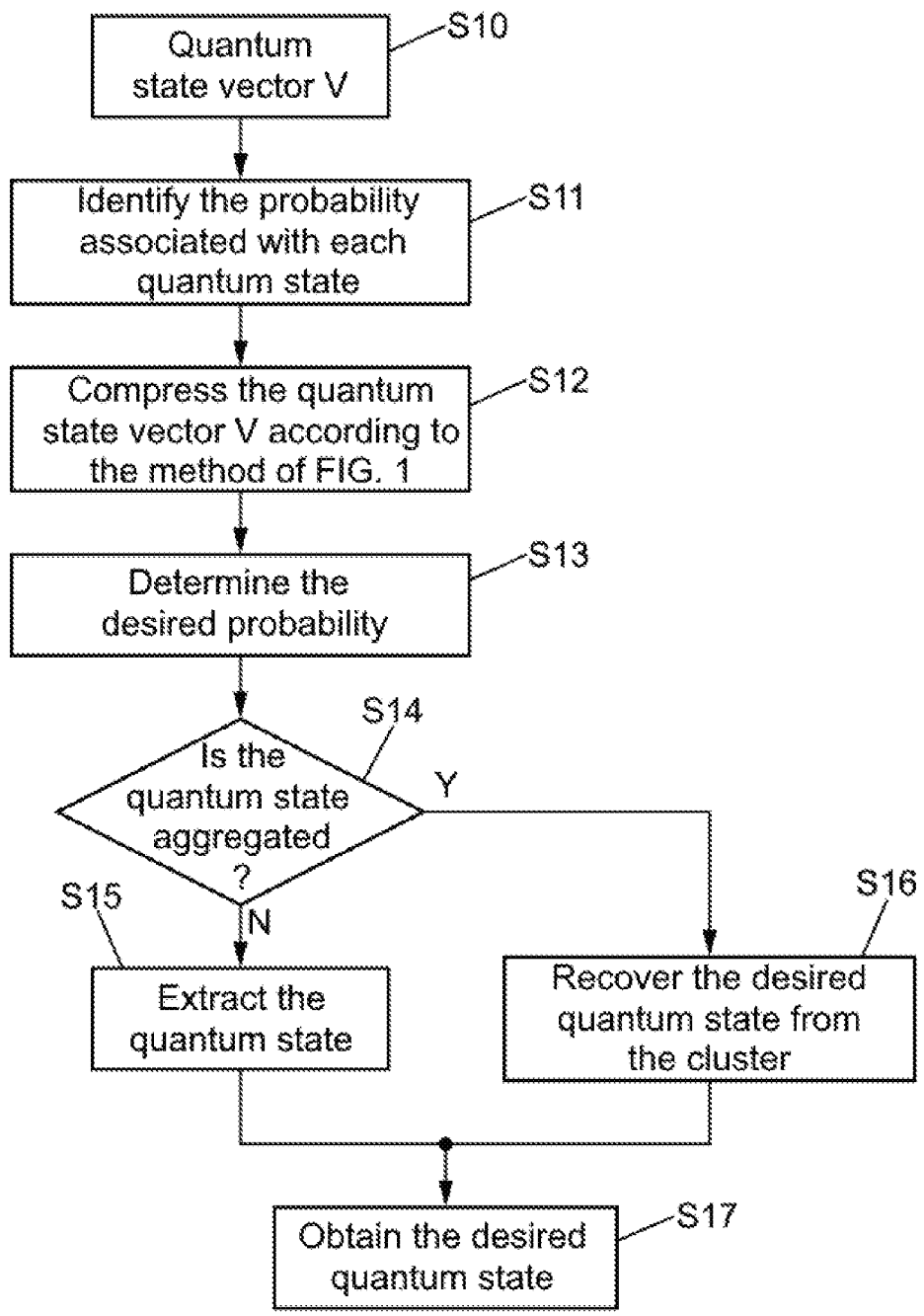
FIG. 2 is a flowchart representing the main steps of a process for storing a quantum state vector according to the invention.

FIG. 2 illustrates the main steps of a process for the storage of a quantum state vector. The storage process has applications for example in an execution in a quantum circuit. During such execution, the quantum simulator returns a value of the quantum state vector. For this, the quantum simulator can make a random selection that is dependent upon the probability of each quantum state. To reproduce the execution of the simulation, the random selection can be made from the set of quantum states. This then involves determining which quantum state is associated with the randomly selected probability, as described below with reference to FIG. 2.

In step S10, a quantum state vector V is provided. The quantum state vector is as described with reference to FIG. 1.

In step S11, an identification of the probabilities associated with each quantum state of the quantum state vector is performed. More precisely, the probability of each quantum state is calculated from the amplitude of each quantum state.

The table below illustrates all the quantum states of a quantum state vector of 3 qbits.

| State | Value of qbits | Amplitude | Probability |
|---|---|---|---|
| 0 | 000 | 0 | 0 |
| 1 | 001 | 0.25 + 0 i | 0.0625 |
| 2 | 010 | 0 | 0 |
| 3 | 011 | 0.75 + 0 i | 0.5625 |
| 4 | 100 | 0.5 + 0 i | 0.25 |
| 5 | 101 | 0.25 + 0 i | 0.0625 |
| 6 | 110 | 0 | 0 |
| 7 | 111 | 0.25 + 0 i | 0.0625 |

Thus, for a quantum state vector comprising 3 qbits, there are 8 quantum states. The sum of the probabilities of each quantum state is indeed equal to 1.

The quantum state vector is compressed in step S12. The compression of the quantum state vector is performed according to the compression method described with reference to FIG. 1.

By following this method, the first threshold and/or the second threshold are defined as being proportional to the logarithm of the number of quantum states, in other words equal to $d \cdot \log(8)$. where d is comprised between 0.1 and 10. We thus have a first threshold and/or a second threshold comprised between 0.09 and 1. Indeed, the first threshold and/or the second threshold cannot be greater than 1, as the sum of the probabilities is equal to 1.

In the illustrated numerical example, the first threshold and/or the second threshold are defined as being comprised between 0.25 and 0.35.

Thus, quantum states 0 to 2 can be aggregated into a first group of quantum states. Their respective probabilities are below the first threshold. Moreover, the sum of their probabilities is below the second threshold. The parameter representative of the probability of this cluster is equal to the sum of the probabilities of quantum states 0 to 2.

Quantum state 3 is preserved because its probability is greater than the first threshold and second threshold, and no neighboring quantum state is associated with the same probability.

In the same manner, quantum state 4 is preserved.

Quantum states 5 to 7 are aggregated into a cluster of quantum states in the same manner as described with reference to the cluster of quantum states 0 to 2. The probability associated with this cluster is equal to the sum of the probabilities of quantum states 5 to 7.

The table below illustrates the quantum states of the compressed quantum state vector.

| Quantum states | Probability |
|---|---|
| 0-2 | 0.0625 |
| 3 | 0.5625 |
| 4 | 0.25 |
| 5-7 | 0.125 |

In step S13, the desired probability is determined. For this, a probability can be randomly selected. Then, the quantum state vector is scanned linearly for example in order to determine the quantum state associated with the desired probability.

More precisely, let x be the randomly selected probability. Probability x is the desired probability. If x is less than 0.0625, the quantum state associated with the desired probability is found in the cluster of quantum states 0 to 2.

If x is between 0.0625 and 0.625, the desired quantum state is quantum state 3. Indeed, 0.0625 is the low range since the probability of the first cluster is 0.025. On the other hand, 0.625 is the high range because the probability of the first cluster added to the probability of state 3 is 0.625.

If x is between 0.625 and 0.875, the desired quantum state is quantum state 4. In fact, 0.625 added to the probability of quantum state 4 gives 0.875.

Finally, if x is between 0.875 and 1, the desired quantum state lies in the cluster of quantum states 5 to 7.

This determination is made in step S14.

If it is determined that the desired probability is associated with a quantum state of a quantum state cluster, the corresponding quantum state is recovered from the cluster. More precisely, the quantum state is recalculated. This can be done using a Feynman or path-integral type of partial simulation method. "Partial simulation" is understood to mean a method that allows calculating at least a portion of the final state vector.

Recovery of the quantum state from a cluster may be done in different ways in step S16.

For example, all quantum states of the cluster may be recalculated, in order to know their probability and to determine which quantum state corresponds to the desired probability. Other quantum states of other clusters may not be recalculated.

The quantum states of the cluster in which the quantum state associated with the desired probability is located may be successively recalculated until the corresponding quantum state is determined. The rest of the quantum states of the cluster are not recalculated for example.

In another variant, the quantum states of the cluster are all recalculated in parallel, and then the quantum state associated with the desired probability is determined.

When the desired probability corresponds to a preserved quantum state, meaning a quantum state not in a cluster, the quantum state is extracted without requiring further calculations, as illustrated in step S15.

The desired quantum state is thus obtained in step S17.

The quantum state vector, which usually comprises a very large number of qbits and therefore an exponentially large number of quantum states, can thus be compressed at a very high ratio. The compressed information, meaning the grouped quantum states, are lost for awhile but can be retrieved if necessary on the basis of their probability. The lost information is recalculated by means of a partial simulation method that is inexpensive in terms of run time.

The desired quantum state may be returned as output from a quantum computer.

Figure 3:
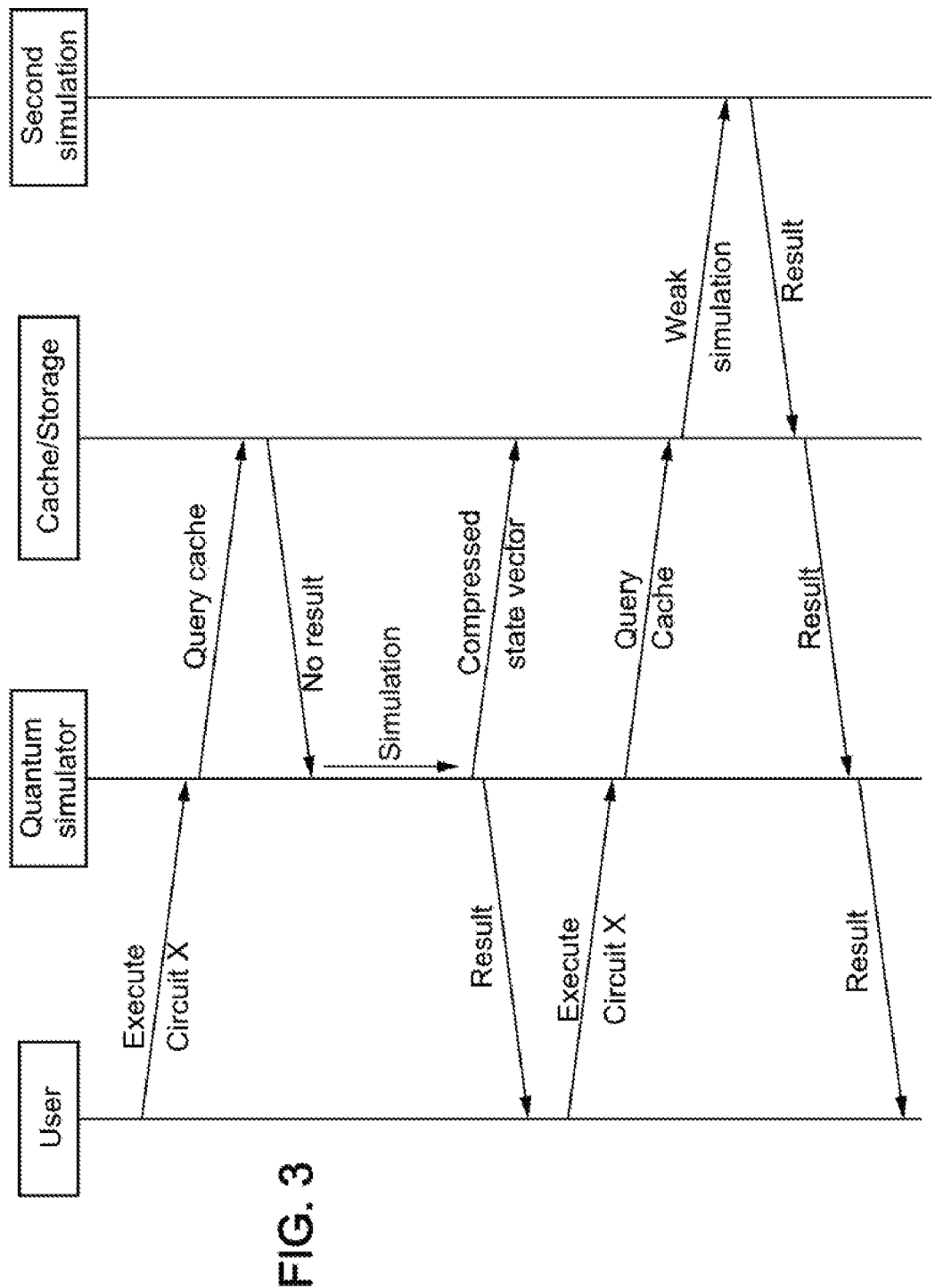
FIG. 3 is a diagram illustrating a use of the method for the storage and compression of a quantum state vector according to an exemplary embodiment of the invention.

FIG. 3 illustrates a use of the method for the storage and compression of a quantum state vector according to one exemplary embodiment of the invention. More precisely, FIG. 3 illustrates the storage of a compressed quantum state vector, in a cache in memory.

The user launches a first execution of the quantum circuit, corresponding to obtaining the quantum state vector in steps S1 and S10 of FIGS. 1 and 2. The execution command is sent to the quantum simulator, which queries the cache or the storage space. The query does not give any result since it is the first execution. The quantum simulator then performs the simulation, corresponding for example to the compression of the quantum state vector described in FIG. 1. The result of this simulation is sent to the user, for example as output from the quantum circuit. At the same time, the result of the simulation, meaning the compressed quantum state vector, is stored in the cache or any other storage space.

The user then launches a second execution of the quantum circuit. The execution command is sent to the quantum simulator, which queries the cache. The execution command is, for example, the search for a quantum state using a randomly selected probability. The quantum simulator queries the cache that comprises the compressed quantum state vector. When the desired quantum state is a preserved quantum state, the quantum simulator simply extracts the quantum state which is then obtained by the user as output from the simulator. When the desired quantum state is located in a cluster, a second simulation is performed, corresponding to a Feynman type partial simulation method or a stabilizer method. The desired quantum state is returned to the user.

Storing the simulation results in a cache makes it possible to reduce the computational resources required, since the compression of the quantum state vector can be carried out only once, the quantum state vector then being stored in the cache.

The methods for storing a quantum state vector and/or compressing a quantum state vector have other applications.

For example, the methods can be used in decoding processes for cryptographic keys, the desired quantum state corresponding to the cryptographic key to be decoded.

The methods can also be used to search for an item stored in a database, on the basis of one or more search criteria.

The invention claimed is:

1. A method for compressing a quantum state vector during a simulation of a quantum circuit on a quantum computer, the method comprising:
    at least one step of aggregating a group of several neighboring states of the vector into a cluster of states of the vector,
        a parameter representative of the probability of this cluster being associated with it and corresponding to the sum of the probabilities of the aggregated neighboring states in this cluster,
the probability of each aggregated neighboring state being below a given aggregation threshold, and/or
the sum of the probabilities of the aggregated neighboring states in a cluster being below another given aggregation threshold,
at least one preservation step,
a state of the vector not aggregated in a cluster being preserved, the parameter representative of its probability remaining unchanged,
the compression method comprising:
at least several steps of aggregating several distinct groups of several neighboring states of the vector, respectively into several clusters of states of the vector,
and/or at least one aggregation step and at least one preservation step.

2. The method for compressing a quantum state vector according to claim 1, comprising:
several steps of aggregating several distinct groups of several neighboring states of the vector, respectively into several clusters of states of the vector,
several preservation steps.

3. The method for compressing a quantum state vector according to claim 1, wherein:
the probability of each aggregated neighboring state is below a given threshold, and the sum of the probabilities of the aggregated neighboring states in a cluster is below another given threshold.

4. The method for compressing a quantum state vector according to claim 1, wherein:
the probability of each preserved state is above a given preservation threshold, and/or the sum of the probabilities of the preserved states is above another given preservation threshold.

5. The method for compressing a quantum state vector according to claim 1, further comprising:
the grouping of several neighboring quantum states for which the probabilities are all identical.

6. The method for compressing a quantum state vector according to claim 1, wherein:
said given aggregation threshold and/or said other given aggregation threshold are proportional to the inverse of the logarithm of the number of quantum states.

7. The method for compressing a quantum state vector according to claim 1, wherein:
said given preservation threshold and/or said other given preservation threshold is or are chosen so that the number of clusters is proportional to the logarithm of the number of quantum states,
and/or said given preservation threshold and/or said other given preservation threshold is or are chosen so that the number of clusters remains less than 1000.

8. The method for compressing a quantum state vector according to claim 7, wherein:
said given preservation threshold and/or said other given preservation threshold is or are chosen so that the number of clusters remains greater than 10.

9. The method for compressing a quantum state vector according to claim 1, wherein:
the vector comprises at least $2^{20}$ quantum states.

10. The method for compressing a quantum state vector according to claim 1, wherein:
at least 90% of the quantum states of the vector are aggregated.

11. The method for compressing a quantum state vector according to claim 1, wherein:
the ratio of the number of aggregated states to the number of non-aggregated states is greater than $2^{20}$.

12. The method for compressing a quantum state vector according to claim 1, wherein:
one or more steps of aggregating one or more groups of several neighboring states of the vector into one or more clusters of states of the vector, is or are performed by assigning, to said cluster, a parameter representative of the probability of this cluster corresponding to the complement of the sum of the probabilities of the states previously determined, meaning both the aggregated continuous states and the preserved states.

13. The method for compressing a quantum state vector according to claim 1, wherein:
the number of states of the quantum state vector is greater than $2^{20}$,
the number of quantum state vectors to which the compression method is applied, is greater than $2^{20}$.

14. A process for storing a quantum state vector, comprising:
a step of identifying the different states of the vector and the parameters representative of the probabilities respectively associated with them,
a step of compressing the vector, using the method for compressing a quantum state vector according to claim 1,
a step of determining the probability of the desired quantum state,
a step of associating the desired quantum state with the determined probability,
either simply by extracting the desired quantum state corresponding to the determined probability, when the desired quantum state is preserved,
or by recovering the desired quantum state corresponding to the determined probability, when the desired quantum state is aggregated in a cluster, by recalculating this desired quantum state aggregated in this cluster.

15. The process for storing a quantum state vector according to claim 14, wherein:
the desired quantum state vector is returned as output from a quantum computer.

16. The process for storing a quantum state vector according to claim 14, wherein:
all or part of the quantum states of the cluster containing said desired quantum state is or are recalculated,
no quantum state of the other clusters which do not contain said desired quantum state is recalculated.

17. The process for storing a quantum state vector according to claim 14, wherein:
the quantum states of the cluster containing said desired quantum state are successively recalculated until said desired quantum state is obtained,
or the quantum states of the cluster containing said desired quantum state are all recalculated in parallel in order to obtain said desired quantum state.

18. The process for storing a quantum state vector according to claim 14, wherein:
the recovery recalculates this desired quantum state aggregated in this cluster by applying a partial simulation method to all or part of the quantum states aggregated in this cluster.

19. The process for storing a quantum state vector according to claim 18, wherein the partial simulation method is a Feynman method, in other words via a path integral.

20. A process for storing a quantum state vector, comprising:
- a step of identifying the different states of the vector and the parameters representative of the probabilities respectively associated with them,
- a step of compressing the vector using the method for compressing a quantum state vector according to claim 1,
- a step of determining the probability of the desired quantum state,
- and one of the following two steps:
    - either a step of associating the desired quantum state with the determined probability, simply by extracting the desired quantum state corresponding to the determined probability, when the desired quantum state is preserved,
    - or a step of recalculating all the quantum states of said stored quantum state vector.

* * * * *